US011385472B2

(12) United States Patent
Lippey et al.

(10) Patent No.: US 11,385,472 B2
(45) Date of Patent: Jul. 12, 2022

(54) 3D EYEWEAR ADAPTED FOR FACIAL GEOMETRY

(71) Applicant: Dolby Laboratories Licensing Corporation, San Francisco, CA (US)

(72) Inventors: Barret Lippey, Foster City, CA (US); Martin J. Richards, Gig Harbor, WA (US); Christopher L. Huang, Walnut Creek, CA (US); Thao Hovanky, San Francisco, CA (US); Wilson Heaton Allen, Mill Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 436 days.

(21) Appl. No.: 16/337,884

(22) PCT Filed: Sep. 27, 2017

(86) PCT No.: PCT/US2017/053679
§ 371 (c)(1),
(2) Date: Mar. 28, 2019

(87) PCT Pub. No.: WO2018/064146
PCT Pub. Date: Apr. 5, 2018

(65) Prior Publication Data
US 2019/0235260 A1 Aug. 1, 2019

Related U.S. Application Data (60) Provisional application No. 62/402,964, filed on Sep. 30, 2016.

(51) Int. Cl.
*G02B 30/00* (2020.01)
*G02B 30/23* (2020.01)
(Continued)

(52) U.S. Cl.
CPC ............. *G02B 30/23* (2020.01); *G02B 5/285* (2013.01); *G02C 5/122* (2013.01); *G02C 5/126* (2013.01)

(58) Field of Classification Search
CPC . G02C 5/126; G02C 5/12; G02C 5/02; G02C 5/06; G02C 5/10; G02C 5/122;
(Continued)

(56) References Cited

U.S. PATENT DOCUMENTS

| 4,470,673 A | 9/1984 | Gilson |
| 5,880,773 A | 3/1999 | Suzuki |

(Continued)

FOREIGN PATENT DOCUMENTS

| CH | 666558 | 7/1988 |
| CN | 2643339 | 9/2004 |

(Continued)

OTHER PUBLICATIONS

Author(s) n/a, "Adaptive Eyewear's one size fits all glasses can be quickly fitted with the guidance of a trained health worker, overcoming the traditional barriers to delivering vision correction in low-income countries", located via Google, Adaptive Eyewear, http://www.adaptive-eyewear.org/solution.html.

(Continued)

*Primary Examiner* — Stephone B Allen
*Assistant Examiner* — Jyotsna V Dabbi (57) ABSTRACT

Three dimensional (3D) glasses suited for wearers with varying facial geometries may include a frame adapted to position spectrally filtering lenses at a particular distance from the eyes of the wearer. The 3D glasses may include a means for adjusting the distance between the lenses and the eyes of the wearer. The lenses may include positive runout.

8 Claims, 9 Drawing Sheets

(51) Int. Cl.
*G02C 5/12* (2006.01)
*G02B 5/28* (2006.01)

(58) Field of Classification Search
CPC ........ G02C 5/128; G02C 5/008; G02B 30/23; G02B 30/22; G02B 30/20; G02B 30/00; G02B 5/285; G02B 5/28; G02B 5/20; G02B 5/00; G02B 5/286–288; H04N 13/214; H04N 13/334
USPC .......................................................... 359/464
See application file for complete search history.

(56) References Cited

U.S. PATENT DOCUMENTS

| | | | |
|---|---|---|---|
| 5,971,538 A | 10/1999 | Heffner | |
| 6,959,988 B1 | 11/2005 | Sheldon | |
| 7,488,068 B2 | 2/2009 | Welchel | |
| 7,784,938 B2 | 8/2010 | Richards | |
| 8,012,386 B2 | 9/2011 | Clerc | |
| 8,491,116 B2 | 7/2013 | Ohno | |
| 8,547,635 B2 | 10/2013 | Saylor | |
| 9,164,293 B2 | 10/2015 | Farnam | |
| 9,269,066 B2 | 2/2016 | Healy | |
| 2008/0278807 A1* | 11/2008 | Richards | G02C 7/107 359/464 |
| 2011/0102563 A1 | 5/2011 | Johnson, Jr. | |
| 2011/0213664 A1 | 9/2011 | Osterhout | |
| 2011/0317122 A1 | 12/2011 | Havens-Olmstead | |
| 2012/0224260 A1 | 9/2012 | Healy | |
| 2014/0160423 A1 | 6/2014 | Coty | |
| 2015/0002374 A1 | 1/2015 | Erinjippurath | |
| 2015/0234202 A1* | 8/2015 | Caviezel | G02C 5/126 351/132 |
| 2015/0355481 A1* | 12/2015 | Hilkes | G02C 5/124 351/204 |
| 2015/0362745 A1* | 12/2015 | Hamilton | G02C 5/124 351/55 |
| 2017/0017094 A1* | 1/2017 | James | G06Q 30/0621 |

FOREIGN PATENT DOCUMENTS

| | | |
|---|---|---|
| CN | 2643339 Y | 9/2004 |
| CN | 202067029 | 12/2011 |
| CN | 105607281 | 5/2016 |

OTHER PUBLICATIONS

Essilor: "Fitting and Dispensing Guide" Jan. 1, 2008, Varilux Fitting Guide.

* cited by examiner

3D EYEWEAR ADAPTED FOR FACIAL GEOMETRY

CROSS-REFERENCE TO RELATED APPLICATION

This application is a national stage application, filed under 35 U.S.C. § 371, of International Patent Application No. PCT/US2017/053679, filed on Sep. 27, 2017, and claims the benefit of priority from U.S. Provisional Patent Application No. 62/402,964 filed Sep. 30, 2016, each of which is hereby incorporated by reference in its entirety.

BACKGROUND OF THE INVENTION

Field of the Invention

This invention relates generally to three-dimensional (3D) projection systems, and more particularly to eyewear for use with 3D projection systems.

Description of the Background Art 3D projection systems are known. 3D images are created by forming separate right and left eye images with varying depths of field. The 3D images are typically filtered through some form of eyewear to ensure the right eye receives only the right eye images and the left eye receives only the left eye images. One example method of 3D imaging is spectral separation. Systems that utilize spectral separation create separate images using two distinct color spectrums. For example, the left eye image is created with light having wavelengths within a portion of each of the red, green and blue portions of the color spectrum, while the right eye image is created with light having wavelengths within a separate portion of each of the red, green and blue portions of color spectrum. A band pass filter disposed in front of the left eye passes light composing the left eye image and blocks light composing the right eye image. A band pass filter disposed in front of the right eye passes light composing the right eye image and blocks light composing the left eye image.

Systems utilizing spectral separation have problems. For example, wavelength properties of the filter shift when light is incident on the filters at large angles of incidence. This shift changes the wavelengths of the light that are either passed or blocked by the filter, and can cause crosstalk between the right eye and left eye filters and a reduction in optical efficiency. Previous solutions include curving the filters to minimize off axis incidence; however, this solution is not ideal in every situation.

SUMMARY

The inventors have discovered that certain problems of the prior art are exacerbated for viewers with certain facial geometries, for example nose bridge length and brow position. Problems of the prior art are overcome by providing eyewear that provides a quality 3D viewing experience for both viewers with relatively long nose bridges and viewers with relatively short nose bridges. The design of eyewear considers differing facial geometries of viewers and minimizes wavelength shifting that can result therefrom.

Eyewear for viewing 3D images, each 3D image including a left eye image and a right eye image, is disclosed. Example eyewear includes a left lens, a right lens, and a frame for holding the left lens and the right lens within a predetermined distance range from the left eye and the right eye of the wearer. The left lens includes a first set of spectral filters adapted to pass the left eye images and to block the right eye images. The right lens includes a second set of spectral filters adapted to pass the right eye images and to block the left eye images. The frame includes one or more positioning surfaces disposed to abut the face of a wearer. The positioning surface(s) position the left lens and the right lens within a predetermined distance range from the left eye and the right eye of the wearer, respectively.

An example positioning surface includes a nose engaging surface. Optionally, the nose engaging surface is embodied in a nose piece that is selectively detachable from the frame. Another example positioning surfaces includes a brow engaging surface.

The one or more positioning surfaces limit the distance between the left lens and the left eye of the wearer and the distance between the right lens and the right eye of the wearer to a minimum distance in the range of 15-20 mm. The positioning surfaces thereby prevent the lenses from being positioned too close the wearers eyes, which can exacerbate the angular obliqueness at which light passes through the lenses, thereby increasing a wavelength shift of filter properties for that light.

The left lens and the right lens each include an optical coating. In the example eyewear, the thickness of the optical coating is greater near edges of the left lens and the right lens than near the center of the left lens and the right lens. The thickness increase is, for example, an increase in thickness of individual layers of the optical coating. This feature of the lens coating is referred to herein as positive runout. In an example embodiment, the increased thickness of layers of the optical coating at lateral edges of the left lens and the right lens provides an offsetting wavelength shift (e.g., a red shift of filter properties) of passbands of the optical coating in a range of 0%-2% to accommodate light of the desired wavelength passing through at large angles of incidence. The increased thicknesses of the optical coating at a medial edge of the left lens provides an offsetting wavelength shift of passbands of the optical coating in a range of −1%-+1%, and the increased thicknesses of the optical coating at a medial edge of the right lens provides an offsetting wavelength shift of passbands of the optical coating in a range of −0.5%-+1% to accommodate light of the desired wavelength passing through at large angles of incidence. In both the left and right lenses, the increased thicknesses of the optical coating at superior and inferior edges of the lenses provides an offsetting wavelength shift of passbands of the optical coating to a range of −1.5%-+1% to accommodate light of the desired wavelength passing through at large angles of incidence. Lenses with coating having the disclosed positive runout are used in conjunction with the one or more positioning surfaces that limit the distance between the left lens and the left eye of the wearer and the distance between the right lens and the right eye of the wearer to a minimum distance in the range of 15-20 mm.

In a preferred embodiment, the positive runout of the optical filter maintains the desired passbands of the filter for average viewing angles, through the positive runout, associated with particular positions on the lens. As a result, at each relative viewing angle, the appropriate color primaries of the system will be transmitted through the lens to the eye of the viewer. In an example embodiment, the increased thickness of said optical coating at lateral edges of the left lens and the right lens provides an offsetting wavelength shift of passbands of the optical coating of 1%. In addition, the increased thickness of the optical coating at a medial edge of said left lens provides an offsetting wavelength shift of passbands of the optical coating of 0%, and the increased thickness of the optical coating at a medial edge of the right lens provides an offsetting wavelength shift of passbands of the optical coating in a range of 0.3%. Furthermore, the increased thickness of the optical coating at superior and inferior edges of the left lens and the right lens provides an offsetting wavelength shift of passbands of the optical coating of −0.5%, and the increased thickness of the optical coating at a lateral edge of at least one of the left lens and said right lens provides an offsetting wavelength shift of passbands of the optical coating of 1%. Similar optical properties may be achieved with different types of filters and or similar filters made from different materials. For example, alternating layers of the optical coating may be made from materials that effect the desired optical properties that occur with the above described positive runout. In addition, sections of each filter may be constructed differently again to effect the desired optical properties of a positive runout.

An example method of manufacturing eyewear for viewing 3D images is also disclosed. The example method includes providing a plurality of substantially similar left lenses and providing a plurality of substantially similar right lenses. Each of the left lenses includes an optical coating having a positive runout at an edge of each left lens. Each right lens includes an optical coating having a positive runout at an edge of each right lens.

The example method further includes providing a first plurality of frames and a second plurality of frames. Each frame of the first plurality of frames is adapted for holding one of the left lenses and one of the right lenses and includes one or more positioning surfaces disposed to abut the face of a wearer. The one or more positioning surfaces of the frames of the first plurality of frames are in a first relative position with respect to the left lens and the right lens and position the left lens and the right lens within a predetermined distance range from left and right eyes of the wearer. Each frame of the second plurality of frames is adapted for holding one of the left lenses and one of the right lenses and includes one or more positioning surfaces disposed to abut the face of a wearer. The one or more positioning surfaces of the frames of the second plurality of frames are in a second relative position, different from the first relative position, with respect to the left lens and the right lens and position the left lens and the right lens within a predetermined distance range from left and right eyes of the wearer.

The example method additionally includes fixing some of the left and right lenses into the frames of the first plurality of frames, and fixing others of the left and right lenses into the frames of the second plurality of frames. The example method facilitates using similar lenses in different frames for viewers with different facial geometries.

In a more specific example method, the frames of the first plurality of frames are configured to provide an eye-to-lens distance of 15-20 mm when worn by a person having a nose bridge of a first length. The frames of the second plurality of frames are configured to provide an eye-to-lens distance of 15-20 mm when worn by a person having a nose bridge of a second length shorter than the first length. The example positive runout of the optical coating at lateral edges of the left lens and the right lens offsets a blue shift of filter properties up to 1.8%.

Another example method of manufacturing eyewear for viewing 3D images is disclosed. The method includes providing a plurality of substantially similar left lenses each including an optical coating having a positive runout at an edge of each of the left lenses, and providing a plurality of substantially similar right lenses each including an optical coating having a positive runout at an edge of each of the right lenses. The method additionally includes providing a first plurality of frames adapted for viewers with a relatively short nose bridge, and providing a second plurality of frames adapted for viewers with a relatively long nose bridge. The eyewear is assembled by fixing some of the left and right lenses into the frames of the first plurality of frames, and fixing others of the left and right lenses into the frames of the second plurality of frames.

Yet another example method for manufacturing eyewear for viewing 3D images, each 3D image including a left eye image and a right eye image, is disclosed. The example method includes providing a left lens and a right lens. The left lens includes a first set of spectral filters adapted to pass the left eye images and to block the right eye images. The right lens includes a second set of spectral filters adapted to pass the right eye images and to block the left eye images. The method additionally includes providing a frame for holding the left lens and the right lens. The frame includes one or more positioning surfaces disposed to abut the face of a first wearer and to position the left lens and the right lens within a predetermined distance range from left and right eyes of the first wearer. The method further includes mounting the left lens and the right lens into the frame, and providing a selectively attachable nose bridge extender. The nose bridge extender adjusts the distance from the right lens and the left lens to the right and left eyes of a different wearer to be within the predetermined distance range. In the example method, the predetermined distance range is 15-20 mm, and the spectral filters are embodied in one or more optical coatings having a positive runout at the edges of the left and right lenses.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing three dimensional (3D) eyewear that is suited for users of varying facial geometries. In the following description, numerous specific details are set forth (e.g., widths of spectral bands, lens characteristics, etc.) in order to provide a thorough understanding of the invention. Those skilled in the art will recognize, however, that the invention may be practiced apart from these specific details. In other instances, details of well-known 3D projection practices (e.g., image generation and filtering) and components have been omitted, so as not to unnecessarily obscure the present invention.

Figure 1:
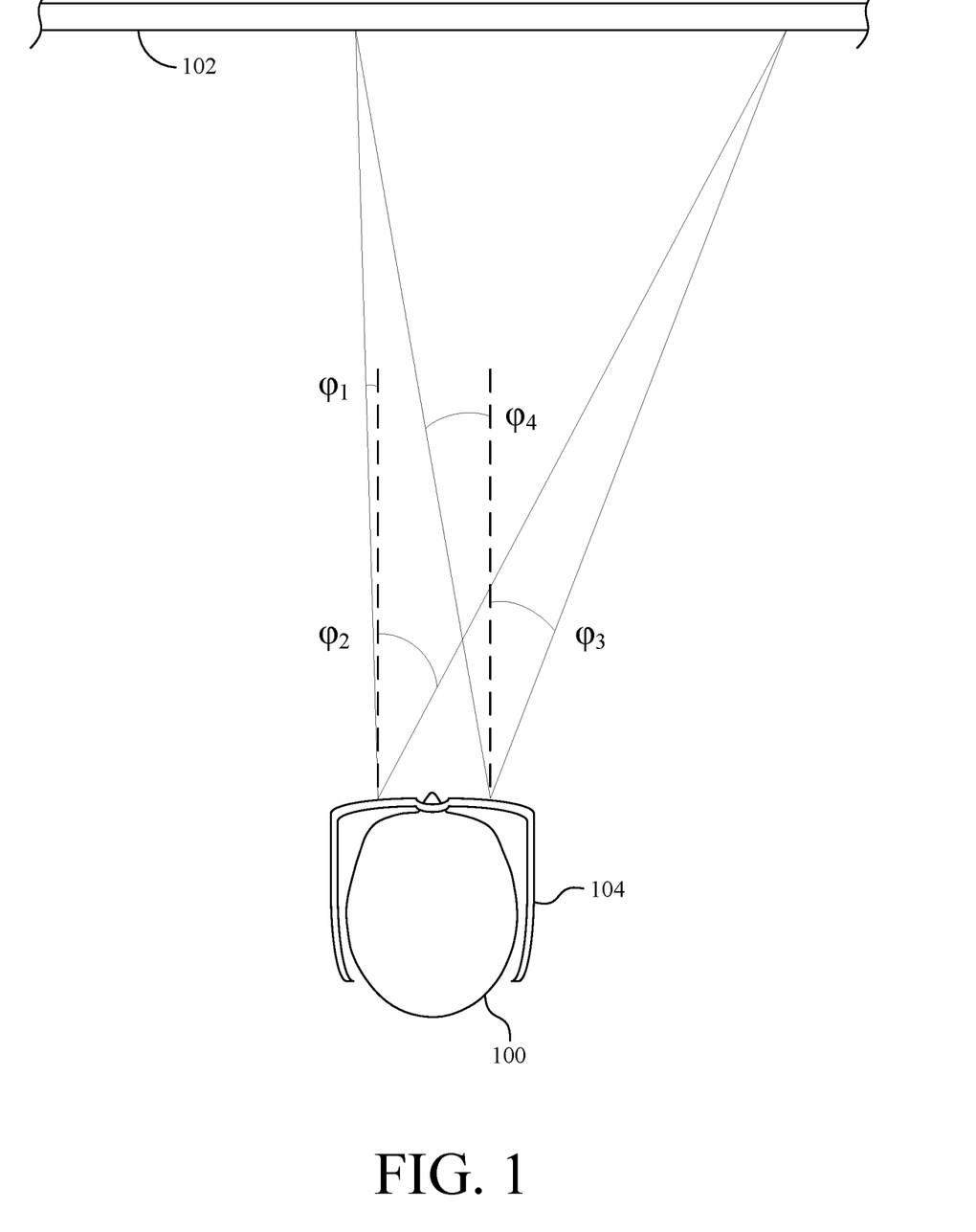
FIG. 1 illustrates various viewing angles associated with viewing a three-dimensional (3D) projection.

FIG. 1 shows a viewer 100 viewing a 3D projection screen 102 through a pair of 3D glasses 104. Light composing 3D images reflects off screen 102 and enters the eyes of viewer 100 through lenses (not visible) built into a pair of 3D glasses 104. The lenses spectrally filter the light to pass only light corresponding to a right eye image to the right eye and light corresponding to a left eye image to the left eye. Because screen 102 has a substantial width, light reflected off screen 102 is incident upon 3D glasses 104 at various angles of incidence (AOIs), based on the location on screen 102 from which the light reflected and which eye of viewer 100 it reaches. These angles can be small (i.e. nearly normal to the surface of the lenses), such as angle $\varphi_1$, or large (i.e. oblique to the surface of the lenses), such as angle $\varphi_2$. The sizes of the angles affect the optical response of 3D glasses 104 to images reflected from screen 102, and larger AOIs can significantly diminish the quality of the viewing experience. These effects will be discussed in more detail with reference to later figures.

Figure 2:
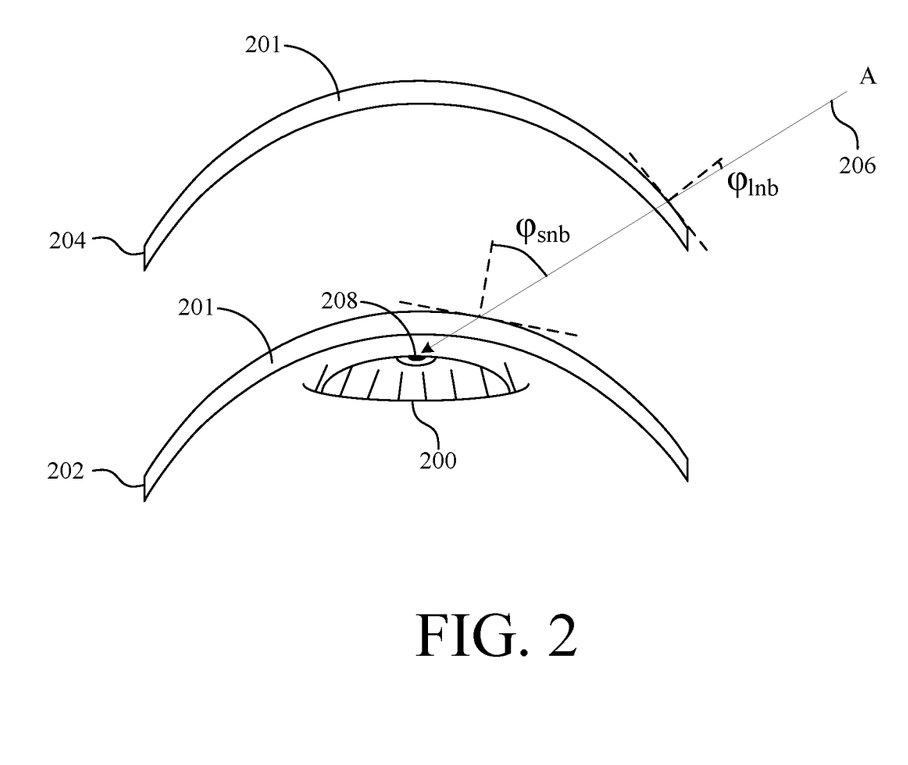
FIG. 2 illustrates the effect of an eye-to-lens (ETL) distance on the angle of incidence of incident light.

FIG. 2 is an illustration showing how an eye-to-lens (ETL) distance affects the AOI of light with respect to a lens surface. An eye 200 of a viewer is positioned relative to a lens 201, in a first position 202 and a second position 204, which is configured for use in a pair of 3D glasses. In first position 202, the ETL distance is short, and in second position 204 the ETL distance is relatively longer. Lens 201 is approximately spherical and has a radius of curvature of approximately 88 mm. Position 202 is representative of the position of a lens of a pair of 3D glasses when worn by someone with a short nose bridge. Position 204 is representative of the position of a lens of a pair of 3D glasses when worn by someone with a long nose bridge.

A single ray of light 206, originating from a point (A), is shown incident on lens 201 in both first position 202 and second position 204 and entering a pupil 208 of eye 200. Because of the difference in the ETL distances of positions 202 and 204 and the curvature of lens 201, the angle of incidence of ray 206 with lens 201 in first position 202 ($\varphi_{snb}$) is larger than the angle of incidence of ray 206 with lens 201 in second position 204 ($\varphi_{lnb}$). The relative dimensions (e.g., the ETL difference and the curvature of lens 201) in FIG. 2 are exaggerated to clearly illustrate the effect of the ETL distance on the AOI of incident light entering pupil 208.

The AOIs of the viewed light can adversely affect the operation of lens 201. Particularly, there is a shift of the wavelength of incident light (i.e. the wavelength of the light becomes shorter or longer) depending on the AOI. The magnitude of the wavelength shift is modeled by the following equation:

$$\lambda_\varphi = \lambda_0 \sqrt{1 - (\sin\varphi/n_{\text{eff}})^2}, \quad (\text{Eq. 1})$$

where $\lambda_\varphi$ denotes the wavelength of the shifted light, $\lambda_0$ denotes the original wavelength of the incident light, $\varphi$ denotes the AOI of the incident light, and $n_{\text{eff}}$ denotes the effective index of refraction of the lens, which is dependent on the material and thicknesses of the coating layers (among other things). For most 3D projection applications, wavelength shifts typically act to blue-shift the coating (i.e. the coating is shifted to shorter wavelengths).

Because lenses utilized in 3D glasses only transmit light within predetermined ranges of wavelengths, the shifting of the coating adversely impacts the intended images viewed through lens 201. The shift causes lens 201 to transmit light that otherwise would have been blocked and vice versa. The problems associated with the wavelength shift are discussed below. An angle as small as 26 degrees can cause a wavelength shift of about 14 nm, which is significant for the proper functioning of lens 201.

Figure 3:
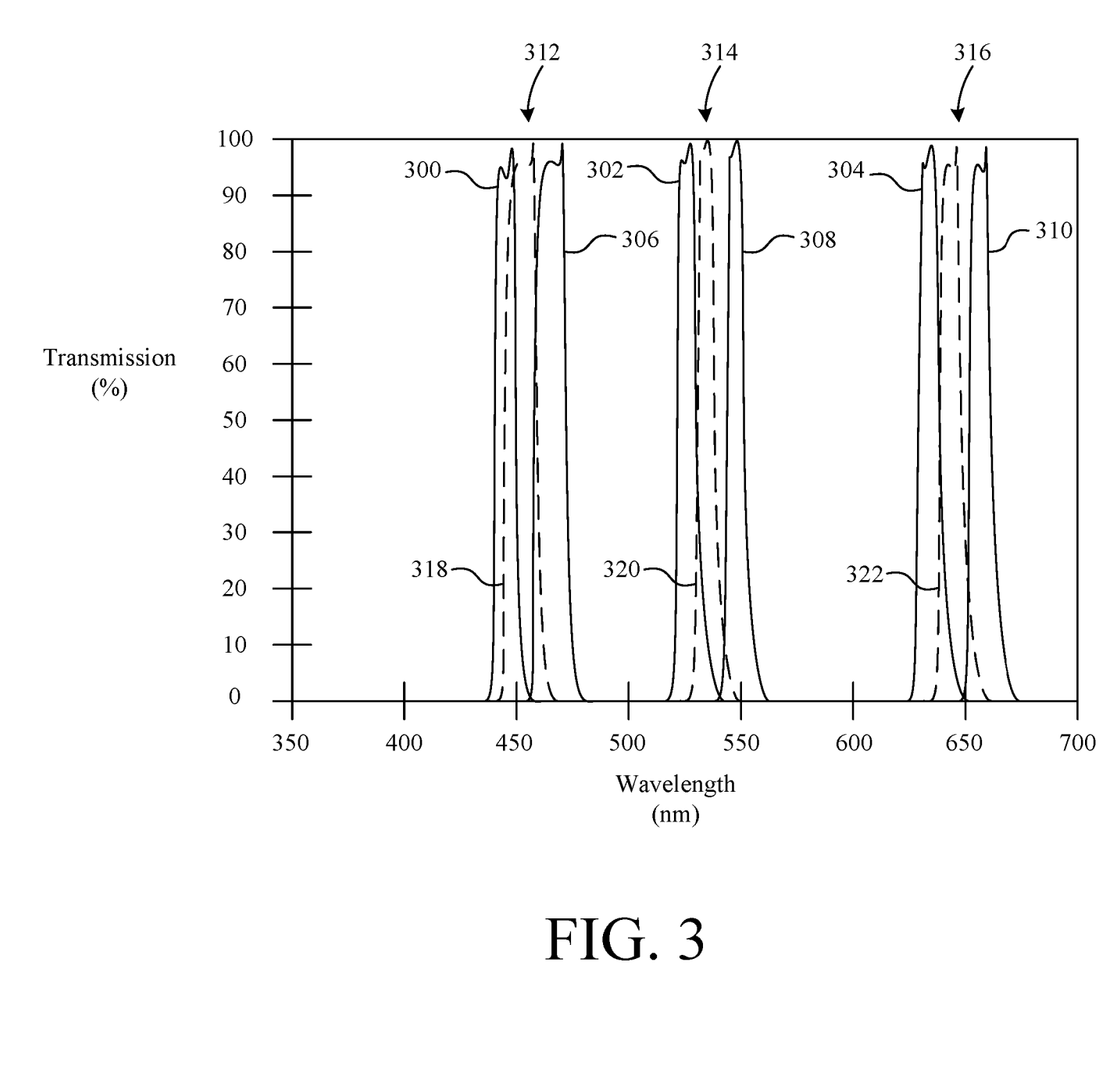
FIG. 3 is a graph showing left eye and right eye spectral bands used to project 3D images.

FIG. 3 is a chart showing spectral bands transmitted by a left eye lens and a right eye lens in, for example, a 3D projection system. The horizontal axis indicates the wavelength of light measured in nanometers (nm), and the vertical axis indicates the transmission of light by percentage. Only wavelengths within a blue left eye spectral band 300, a green left eye spectral band 302, and a red left eye spectral band 304 are transmitted by the left eye lens. Wavelengths within spectral bands 300, 302 and 304 comprise the "shortwave" spectral bands and are transmitted with at least 80% efficiency. The left eye images produced by the 3D projection system are generated with light of the wavelengths included in bands 300, 302, and 304. Only wavelengths within a blue right eye spectral band 306, a green right eye spectral band 308, and a red right eye spectral band 310 are transmitted by the right eye lens. Wavelengths within spectral bands 306, 308, and 310 are the "longwave" spectral bands and are also transmitted with at least 80% efficiency. The right eye images produced by the 3D projection system are generated with light of wavelengths included in bands 306, 308, and 310. Therefore, the left eye lens transmits the left eye images produced by the 3D projection system but not the right eye images, and the right eye lens transmits the right eye images but not the left eye images.

In the example embodiment, spectral band 300 includes light of wavelengths within a range from 438.0 nm to 449.5 nm, and spectral band 306 includes light of wavelengths within a range of wavelengths from 458.5 nm to 472.0 nm. In alternate embodiments, spectral bands 300 and 306 can include light within larger or smaller ranges of wavelengths, based on tradeoffs between color fidelity and image separation, among other things. Spectral bands 300 and 306 can also be made to correspond to the opposite eyes (i.e. spectral band 300 can be transmitted by the right eye lens and spectral band 306 can be transmitted by the left eye lens). Additionally, spectral bands 302 and 308 include light of wavelengths within ranges between 520.0 nm and 529.0 nm and between 543.0 nm and 551.0 nm, respectively. Spectral bands 304 and 310 include light of wavelengths within ranges between 631.0 nm and 638.0 nm and between 652.0 nm and 662.0 nm, respectively. Spectral bands 304, 306, 308 and 310 can also be tuned based on various factors and/or be made to correspond to either eye.

In order to create depth in 3D images, the left eye and right eye images must be different, and should be viewed by the corresponding eye only. Therefore, spectral bands 300 and 306 are separated by a blue band gap 312, spectral bands 302 and 308 are separated by a green band gap 314, and spectral bands 304 and 310 are separated by a red band gap 316. For viewers with long nose bridges, band gaps 312, 314, and 316 are sufficiently wide to prevent crosstalk between right eye images and the left eye lens. However, for viewers with short nose bridges, the angle of incidence (obliqueness of light passing through the lenses) may be significant enough that the spectral properties (or wavelength properties) of the filters or passbands of the filters blue-shift enough to create crosstalk, by, for example, allowing one or more wavelengths of light intended to pass through the left eye lens to instead to pass through the right eye lens.

The potential problem of blue-shift of filter properties for a right eye filter when used by viewers with a short nose bridge is illustrated by FIG. 3. Blue-shifting of the right eye filter creates blue-shifted right eye filter passbands 318, 320, and 322 which are shifted toward shorter or "bluer" wavelengths compared to spectral bands 306, 308, and 310 carrying the right eye image. The blue shifted right eye passband 318 overlaps with blue left eye spectral band 300. Because the right eye passband 318 overlaps with the left eye spectral band 300, some of the left eye image contained in the left eye spectral band is transmitted by the right eye lens, thereby resulting in crosstalk from the left eye image into the right eye image. The crosstalk significantly degrades the image quality as seen by a viewer. Additionally, a blue shifted green right eye passband 320 overlaps with green left eye spectral band 302, and a blue shifted red right eye passband 322 overlaps with red left eye spectral band 304. Each of the additional aforementioned overlaps cause additional crosstalk between the right eye image and the left eye lens. In addition to crosstalk, the amount of light in the image is reduced and color balance is affected. In extreme cases it is possible for an entire spectral band/color or even the entire image to fail to be transmitted through the appropriate eye filter.

Although not explicitly shown, passbands (or pass areas) of the left eye filter are also blue-shifted at large angles of incidence. As with the right eye, only a portion of the shifted left eye filter pass areas will overlap with their corresponding spectral bands (300, 302, and 304 in the left eye case), and, therefore, only a portion of the light comprising the left eye images is transmitted by the left eye lens. Therefore, blue-shifting of the left eye spectral bands causes a significant decrease in the optical efficiency of the 3D system and can reduce a viewer's field of view to only a small portion of the screen. In the case that the left eye images are composed of light in the longwave bands and right eye images are composed of light in the shortwave bands, similar problems will occur with the other channel. In particular, the right eye images will crosstalk into the left eye images due to the blue shifted properties of the passbands (or pass areas) of the left eye lens (or filter), and right eye images will only be partially transmitted by the blue-shifted right eye lens (or filter).

Figure 4:
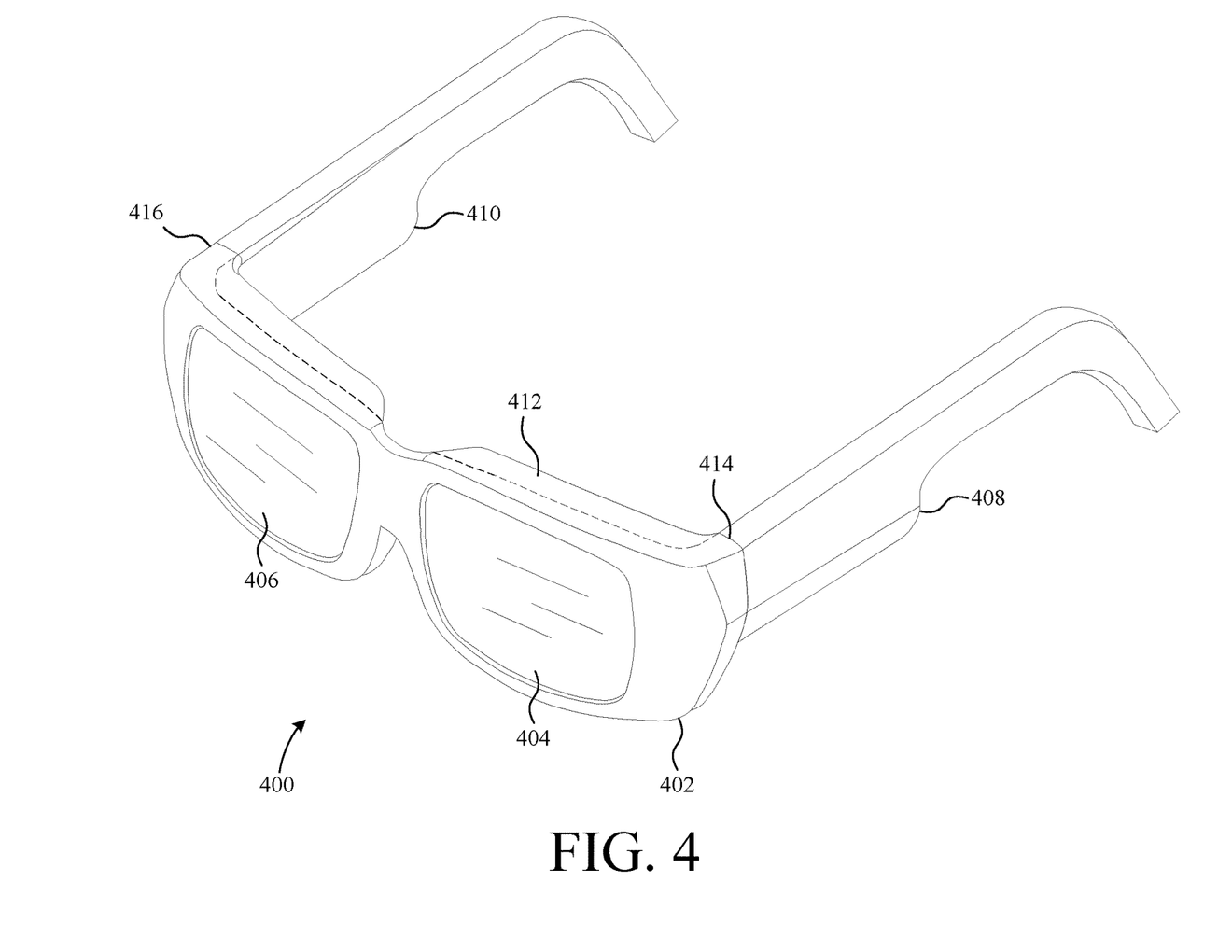
FIG. 4 is a perspective view of an example pair of 3D glasses adapted for use by viewers with a short nose bridge.

FIG. 4 is a perspective view showing a pair of 3D glasses 400 adapted for use by a wearer with a short nose bridge. 3D glasses 400 include a frame 402, a left lens 404, a right lens 406, a left temple piece 408 and a right temple piece 410. Frame 402 is adapted to hold left lens 404 and right lens 406 and position lenses 404 and 406 in front of the eyes of a viewer when 3D glasses 400 are worn. Frame 402 is curved slightly to accommodate the spherically curved lenses. Left lens 404 transmits left eye images corresponding to spectral bands 300, 302, and 304 (FIG. 3), and right lens 406 transmits right eye images corresponding to spectral bands 306, 308, and 310 (FIG. 3).

In order to decrease the AOI of incoming light for the wearer, frame 402 includes a brow shelf 412, which is wider than on the frame of a typical pair of 3D glasses (illustrated by the dotted line). Brow shelf 412 is adapted to abut the wearer's brow or forehead to hold frame 402 and, thus, lenses 404 and 406 at a predetermined distance from the eyes of the viewer. In other words, brow shelf 412 ensures a minimum ETL distance. Inventors have discovered that the ideal ETL distance is between 15 and 20 millimeters (mm).

Additionally, frame 402 includes a nose piece 500 (FIG. 5) adapted to abut the nose of the viewer and provide additional support for frame 402 and maintenance of the desired ETL distance. Brow shelf 412 and nose piece 500 are examples of positioning surfaces that are disposed to abut the face of a wearer at particular points and thereby position left lens 404 and said right lens 406 within a predetermined ETL range. Other positioning surfaces (not shown) can include, but are not limited to cheek rails, posts, and so on. Brow shelf 412 also serves to maintain the vertical alignment of lenses 404 and 406, which prevents shifts in the passbands of the filter coating that can result from tilting of lenses 404 and 406 with respect to the intended vertical orientation.

In one embodiment, the brow shelf (and/or other positioning surfaces) are adjustable to accommodate for variances in brow or other feature locations relative to the eye. The present invention includes 3D glasses with an adjustable ETL distance. The present invention includes 3D glasses with more than one adjustable member each effecting ETL distance. In one embodiment, a theater or other venue (such as an amusement park ride, museum, or tourist attraction) displays a test image (e.g., on the screen or other surface) with instructions for adjusting the brow shelf (or other adjustable points) so that each viewer may easily customize the relative positions and/or ETL distance for best image performance.

Left temple piece 408 is coupled to frame 402 at a left temple region 414 and right temple piece 410 is coupled to frame 402 at a right temple region 416. Left temple portion 408 and right temple portion 410 are adapted to rest upon the left and right ears of the wearer, respectively, to provide additional support for frame 402.

In the example embodiment, frame 402 and temple portions 408 and 410 are molded from plastic to form an integral piece. In alternate embodiments, frame 402 and temple portions 408 and 410 can be formed separately and coupled together via screws or some other fasteners. Additionally, temple portions 408 and 410 are rigidly fixed to frame 402 in the example embodiment. In alternate embodiments, temple portions 408 and 410 can be hinged to better fit the heads of a wide range of users or to be folded and stored.

Figure 5:
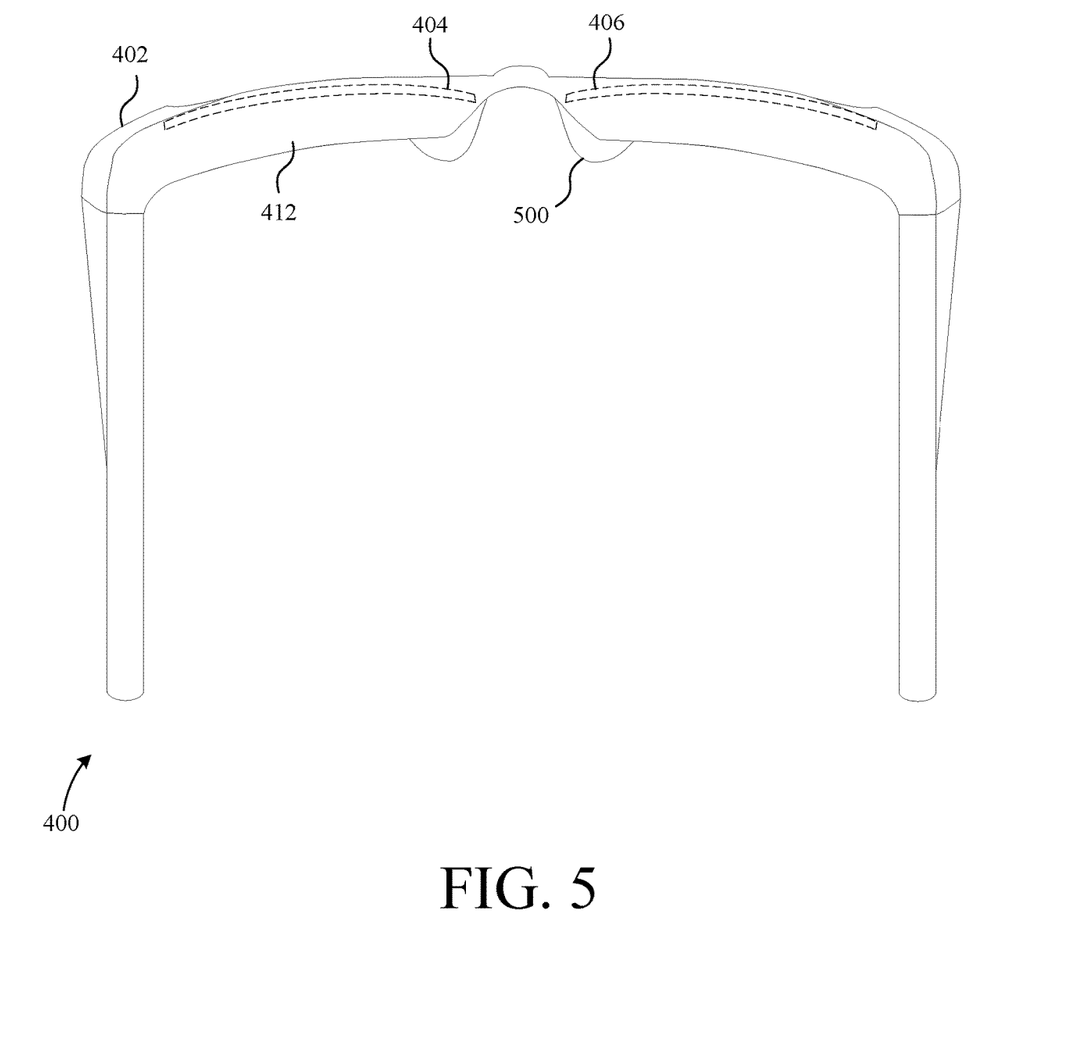
FIG. 5 is a top view of the pair of 3D glasses of FIG. 4.

FIG. 5 is a top view of 3D glasses 400. Frame 402 holds lenses 404 and 406 in place. Lenses 404 and 406 are disposed toward the front edge of frame 402, leaving a relatively large gap between the rear edge of brow shelf 412 and the rear surface of lenses 404 and 406. This gap provides a suitable ETL distance for wearers with short nose bridges. Additionally, frame 402 includes a nose piece 500. Nose piece 500 is adapted to abut the nose of the viewer to hold frame 402 and, thus, lenses 404 and 406 in place in front of the eyes of the viewer, thereby helping to maintain the preferred ETL distance. Nose piece 500 is integral to frame 402 in this example embodiment, but can be formed separately and fixed to frame 402 by a fastener (e.g. a screw) in alternate embodiments, as will be explained with reference to FIGS. 6A and 6B.

Figure 6A:
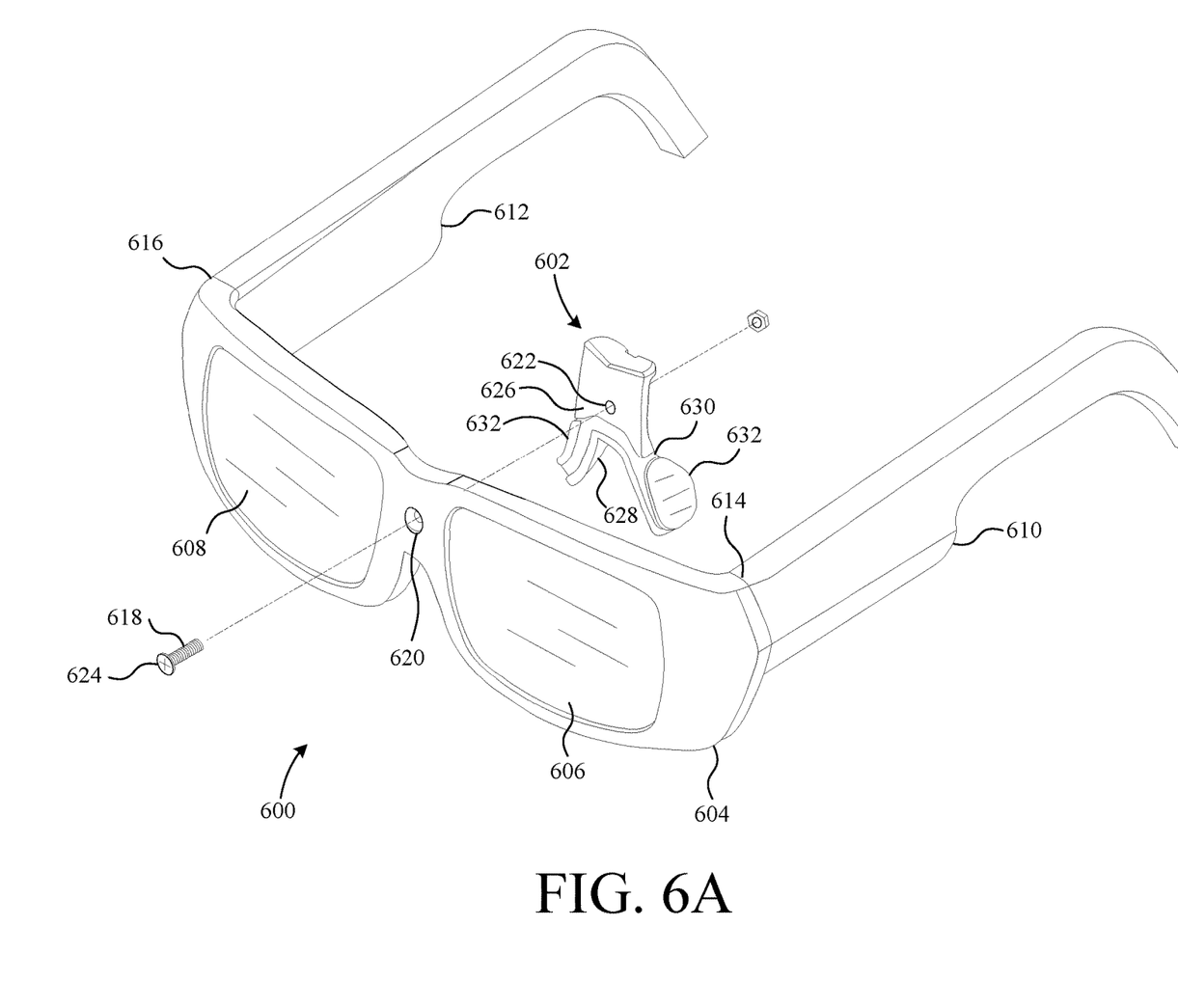
FIG. 6A is an exploded view of an example pair of 3D glasses for a viewer with a long nose bridge and an adapter for a viewer with a short nose bridge.

FIG. 6A is an exploded view of a pair of 3D glasses 600 and a detachable nose adapter 602. 3D glasses 600 include a frame 604, a left lens 606, a right lens 608, a left temple piece 610, and a right temple piece 612. Frame 604 is adapted to hold left lens 606 and right lens 608 and position lenses 606 and 608 in front of the eyes of a wearer when worn. Frame 604 is curved slightly to accommodate the spherically curved lenses. Left lens 606 transmits left eye images corresponding to spectral bands 300, 302, and 304 (FIG. 3), and right lens 608 transmits right eye images corresponding to spectral bands 306, 308, and 310 (FIG. 3). Left temple piece 610 is coupled to frame 604 at a left temple region 614, and right temple piece 612 is coupled to frame 604 at a right temple region 616. Temple portions 610 and 612 are adapted to rest upon the left and right ears, respectively, of the wearer and hold frame 604 and, thus, lenses 606 and 608 in front of the eyes of the wearer.

Frame 604 is designed for a wearer with a long nose bridge, but detachable nose adapter 602 adapts 3D glasses 600 for a wearer with a short nose bridge. Adapter 602 is configured to mount to frame 604 via a screw 618. Screw 618 passes through a hole 620 in frame 604 and threads into a threaded opening 622 in adapter 602. Hole 620 is recessed to allow a head 624 of screw 618 to sit flush with respect to the front surface of frame 604. When screw 618 is threaded completely into threaded opening 622, adapter 602 is pulled tight against frame 604 and is fixed with respect to frame 604. An engaging surface 626 of adapter 602 is configured to abut a rear surface of frame 604 between lenses 606 and 608. Adapter 602 also includes a nose pad 628 configured to rest upon the nose of the wearer. Nose pad 628 is shaped to comfortably fit around the bridge of the wearer's nose and to function as a positioning surface. Nose pad 628 is fixed to a bridge portion 630, which is fixed to a pair of engaging surfaces 632. Engaging surfaces 632 are shaped to abut a nose piece (not shown) of 3D glasses 600, in order to seat adapter 602 securely against frame 604. When adapter 602 is coupled to frame 604, the ETL distance is increased, thus decreasing the AOI of incident light (as described above with reference to FIG. 2). Adapter 602 allows 3D glasses 600, which are designed for viewers with long nose bridges, to be worn by viewers with short nose bridges, while maintaining the viewing quality of displayed 3D images. As with all embodiments describe herein, other methods or practices may be utilized to affix the various parts of the glasses.

Figure 6B:
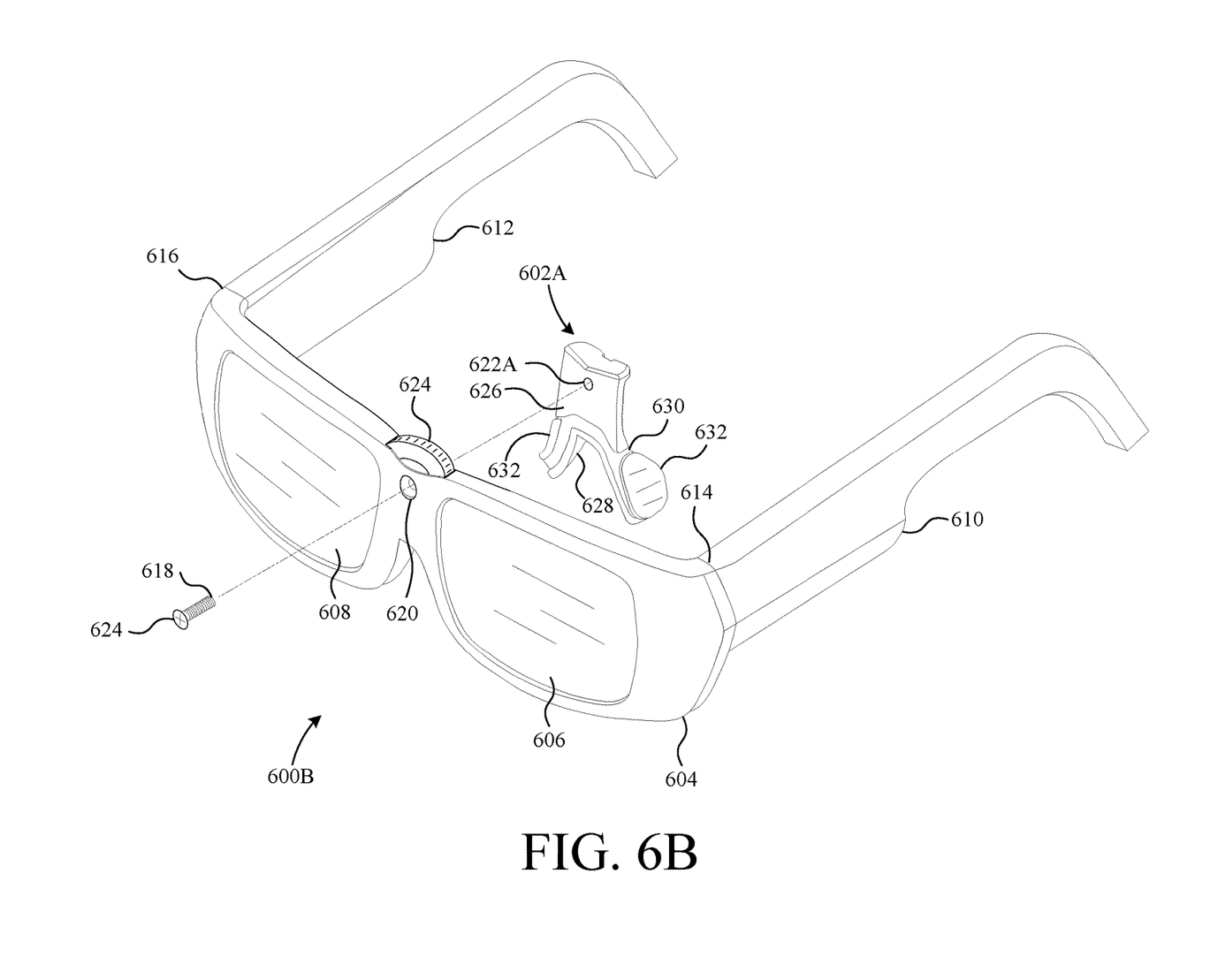
FIG. 6B is an exploded view of another example pair of 3D glasses and an adjustable adapter.

FIG. 6B is an exploded view of a pair of 3D glasses 600B, which are substantially similar to 3D glasses 600, except for additional adjustment functionality provided by alternate nose adapter 602A. Nose adapter 602A is adapted to mount to frame 604 via screw 618. Screw 618 passes through hole 620 in frame 604 and threads into an alternate threaded opening 622A in adapter 602A. When screw 618 is threaded completely into threaded opening 622A, the threaded tip of screw 618 seats firmly within threaded opening 622 and fixes screw 618 in position with respect to nose adapter 602A. An adjustment wheel 624, which is seated in and can rotate relative to frame 604, forms a threaded engagement with screw 618. When the wearer rotates adjustment wheel 624, screw 618 is pulled into or pushed out of hole 620, thus adjusting the position of adapter 602 with respect to frame 604. By adjusting the position of adapter 602, the wearer can adjust the ETL distance, to accommodate the unique facial geometry of the wearer.

Figure 7A:
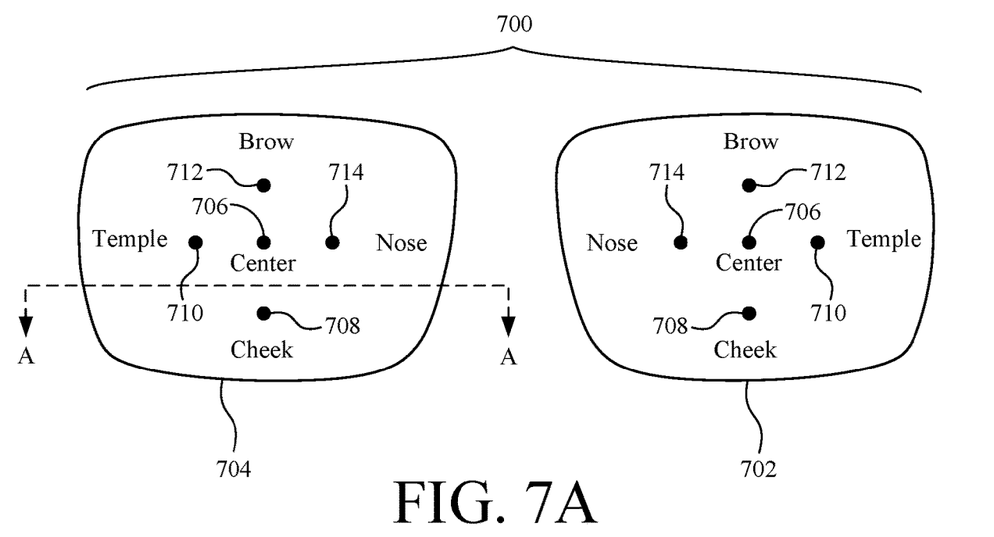
FIG. 7A is a diagram showing locations on an example pair of 3D lenses.

FIG. 7A is a front view of a left lens 700 and a right lens 702. Lenses 700 and 702 include a spectral coating 718 (FIG. 7B) of varying thickness to produce specific spectral responses in the various regions of lenses 700 and 702. Inventors have discovered that varying the thickness of the spectral filter relative to the geometry of the lenses in a specific fashion further decreases the amount of blue-shift when viewing images at oblique AOIs. Each of lenses 700 and 702 includes a center region, a cheek region (near the inferior edge of the lenses), a nose region (near the medial edge of the lenses), a brow region (near the superior edge of the lenses), and a temple region (near the lateral edge of the lenses). The spectral filter is designed to transmit 50% of light of certain wavelengths at various angles of incidence and at various points on the lens surface. The wavelengths correspond to the rising edge of the shortwave spectral band or the falling edge of the longwave spectral band for each color. For example, in one particular embodiment, at a point 706 in the center, the spectral filter of lens 702, is designed to transmit 50% of the light of wavelengths of 455 nm, 540 nm, and 650 nm (the falling edges of the associated spectral bands), and the spectral filter of lens 704 is designed to transmit 50% of the light of wavelengths of 460 nm, 540 nm, and 650 nm (the rising edges of the associated spectral bands), at an AOI of 0 degrees. At a point 708 within the cheek region, about 17 mm vertically from the center, the spectral filter of lens 702 is designed to transmit 50% of the light of wavelengths of 455 nm, 535 nm, and 645 nm, and the spectral filter of lens 704 is designed to transmit 50% of the light of wavelengths of 455 nm, 540 nm, and 650 nm, at an AOI of 11.3 degrees. At a point 710 within the temple region, about 19 mm horizontally from the center, the spectral filter of lens 702 is designed to transmit 50% of the light of wavelengths of 455 nm, 535 nm, and 645 nm, and the spectral filter of lens 704 is designed to transmit 50% of the light of wavelengths of 455 nm, 540 nm, and 660 nm, at an AOI of 12.6 degrees. At a point 712 within the brow region, about 17 mm vertically from the center, the spectral filter of lens 702 is designed to transmit 50% of the light of wavelengths of 455 nm, 535 nm, and 645 nm, and the spectral filter of lens 704 is designed to transmit 50% of the light of the wavelengths of 455 nm, 540 nm, and 650 nm, at an AOI of 11.3 degrees. At a point 714 within the nose region, about 19 mm horizontally from the center, the spectral filter of lens 702 is designed to transmit 50% of the light of wavelengths of 455 nm, 535 nm, and 645 nm, and the spectral filter of lens 704 is designed to transmit 50% of the light of wavelengths of 455 nm, 540 nm, and 650 nm, at an AOI of 12.6 degrees. In alternate embodiments the locations and the wavelengths transmitted can be fine-tuned based on shapes of the lenses and on the spectral bands corresponding to the left eye and right eye images.

Additionally, the spectral filters of lenses 700 are designed to permit only a predetermined amount of wavelength shift at the AOIs specified above. The wavelength shift is measured using the following equation:

$$WS = (\lambda_{SP,Measured} - \lambda_{SP,Designed}) / \lambda_{SP,Designed}, SP = 1, C, T, B, N,$$ (Eq. 2)

where $\lambda_{SP,Measured}$ denotes a spectral average of the wavelengths of the shifted light at a given point on the lens, and $\lambda_{SP,Designed}$ denotes a spectral average of the wavelengths of the rising or falling edges of the spectral bands at a given point on the lens as specified above. Additionally, 1 refers to point 706, C refers to point 708, T refers to point 710, B refers to point 712, and N refers to point 714. To calculate the wavelength shift, first, a spectral average of the wavelengths, at which 50% of light is observed to pass through the spectral filters, is calculated. For example, if 50% of light of wavelengths of 450 nm, 530 nm, and 645 nm is observed passing through the spectral filters at point 706 of lens 702 at an AOI of 0 degrees, then $\lambda_{1,Measured}$ is equal to 450 nm+530 nm+645 nm/3≈542 nm. Next, a spectral average of the wavelengths of the falling edge of the associated spectral band is calculated. For example, at point 706 of lens 702 at an AOI of 0 degrees, the spectral filter is designed to transmit 50% of light at 455 nm, 540 nm, and 650 nm, so $\lambda_{1,Designed}$ is equal to 455 nm+540 nm+650 nm/3≈548 nm. Finally, the wavelength shift is calculated as (542 nm-548 nm)/548 nm≈−0.010 or −1.0%.

Lenses 702 and 704 are each designed to provide a predetermined amount of bandpass wavelength shift at each of points 706, 708, 710, 712, and 714. For example, the spectral filter of lens 702 at point 706 provides approximately 0.4% of wavelength shift, where a negative value denotes blue-shift and a positive value denotes red-shift. At point 708, the spectral filter of lens 702 provides approximately −0.4% of wavelength shift. At point 710, the spectral filter of lens 702 provides approximately 1.7% of wavelength shift. At point 712, the spectral filter of lens 702 provides approximately −0.2% of wavelength shift. At point 714, the spectral filter of lens 702 provides approximately 1% of wavelength shift. Additionally, the spectral filter of lens 704 at point 706 provides approximately −0.2% of wavelength shift. At point 708, the spectral filter of lens 704 provides approximately −0.2% of wavelength shift. At point 710, the spectral filter of lens 704 provides approximately 1.7% of wavelength shift. At point 712, the spectral filter of lens 704 provides approximately −0.2% wavelength shift. At point 714, the spectral filter of lens 704 provides approximately 1% of wavelength shift. In alternate embodiments these specifications can be tightened, relaxed, or translated based on the needs of the wearer and/or manufacturer.

Figure 7B:
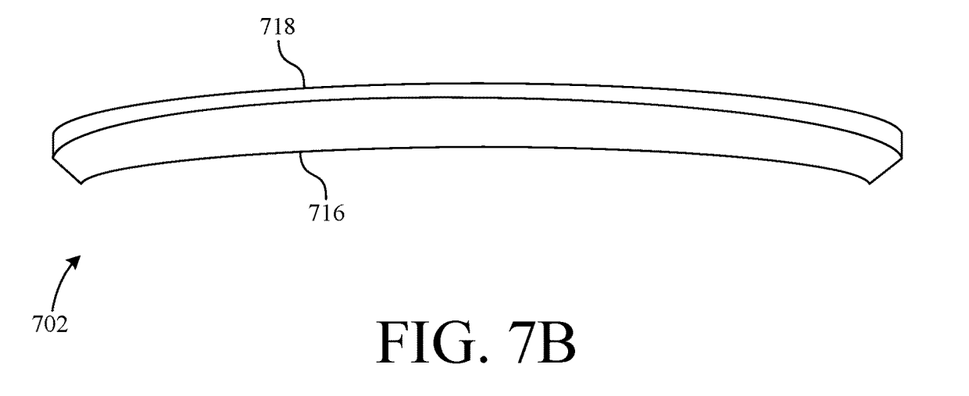
FIG. 7B is a cross-sectional view of one of the lenses of FIG. 7A taken along line A-A.

The percentage wavelength shifts at each point are at least partially determined by the thickness of the spectral coating at that point. FIG. 7B is a sectional view of lens 704 along line A-A of FIG. 7A. Lens 704 is spherically shaped and has a radius of curvature of 88 mm. Lens 704 includes a substrate 716 and a spectral coating 718. Substrate 716 can be formed from glass or plastic and does not correct vision like a prescription lens does. In one embodiment, however, the lens does have a prescription curvature to correct vision, in addition to the other disclosed features. Spectral coating 718 is formed on top of substrate 716 and transmits light of wavelengths within spectral bands 300, 302, and 304 (FIG. 3).

Spectral coating 718 affects the amount of wavelength shift of the filter properties, because the effective index of refraction ($n_{eff}$ in Eq. 2) is determined, at least partially, by the geometric characteristics of the lens. For example, in areas where spectral coating 718 is thicker (meaning the layers of the spectral coating are thicker), the blue shift of the filter properties will be reduced at any given AOI. In areas where spectral coating 718 is thinner, the blue shift of the filter properties will be increased at the same AOIs. Therefore, spectral coating 718 is thinner in the center of lens 704 than it is at the edges of lens 704 (i.e. spectral coating 718 has positive runout). Positive runout helps to eliminate some of the blue shift that occurs when the ETL distance is shorter than the ideal range. It should be noted that too much positive runout can cause its own problem for viewers with a long nose bridge in that positive runout shifts the filter properties to longer wavelengths and if shifted too far (too much positive runout), light incident at normal angles [or perhaps even less oblique angles] for example at the edges of the filter (or wherever the positive runout is applied) may pass through the opposite eye filter passbands (or pass areas). For example, portions of the right eye image (e.g., 306, 308, 310) may pass through the left eye filters if positive runout places the left eye filter passbands (or pass areas) at wavelengths corresponding to the right eye image. This problem is slightly reduced because it will mainly occur toward the edges of the filters and normally incident light at the edges is less likely to enter the pupil. Nonetheless with the variances in facial features and individual positioning of glasses and the range of angles in which viewers are subject themselves (or are subjected to, for example in a theme park ride), the problem exists.

The present invention includes customizing glasses in frame structure (mainly ETL) and positive runout as fitting the average audience member. For example, viewers in China have customized glasses and positive runout which is different from glasses and positive runout in Europe, which is different from that used in Africa, or the Americas. Further, the present invention includes the disclosed amount of positive runout which yields lenses that can be used for all viewers. In particular, these lenses can be utilized in various frames that are designed for viewers with different facial geometry, including both long nose bridge and short nose bridge viewers. The combination of lenses with positive runout and frames adapted to control the ETL distance provides a significant improvement over 3D eyewear of the prior art.

Figure 8:
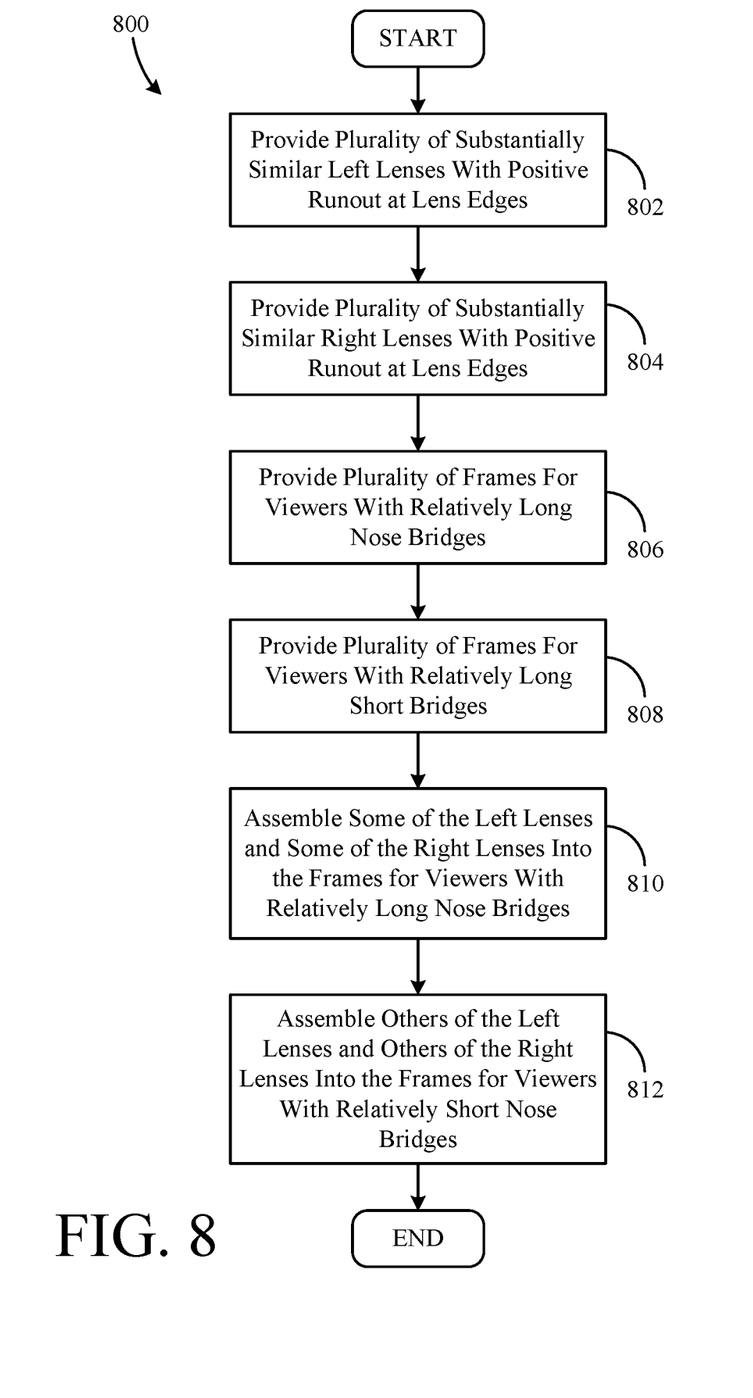
FIG. 8 is a flowchart illustrating an example method of manufacturing eyewear for 3D viewing.

FIG. 8 is a flowchart summarizing an example method 800 of manufacturing eyewear for 3D viewing. In a first step 802, a plurality of substantially similar left lenses, with positive runout of a lens coating at the edges of the lenses, is provided. Next, in a second step 804, a plurality of substantially similar left lenses, with positive runout of a lens coating at the edges of the lenses, is provided. Then, in a third step 806, a plurality of frames for viewers with relatively long nose bridges is provided, and, in a fourth step 808, a plurality of frames for viewers with relatively short nose bridges is provided. Next, in a fifth step 810, some of the left lenses and some of the right lenses are assembled into the frames for viewers with relatively long nose bridges. Then, in a sixth step 812, others of the left lenses and others of the right lenses are assembled into the frames for viewers with relatively short nose bridges. As a result, eyewear is provided that is suitable for both viewers with long nose bridges and viewers with short nose bridges, using the same lenses.

The description of particular embodiments of the present invention is now complete. Many of the described features may be substituted, altered or omitted without departing from the scope of the invention. For example, alternate spectral bands may be substituted for the spectral bands illustrated in FIG. 3. As another example, the adapter of FIG. 6 can be fixed to the eyewear in a number of different ways. For example, a set of grooves can be formed into the adapter and a complementary notch can be formed on the frame of the glasses. The grooves can be shaped to provide variable ETL distances when fit into the notch. These and other deviations from the particular embodiments shown will be apparent to those skilled in the art, particularly in view of the foregoing disclosure.

The invention claimed is:

1. Eyewear for viewing 3D images, each 3D image including a left eye image and a right eye image, said eyewear including:
    a left lens including a first set of spectral filters adapted to pass said left eye images and to block said right eye images;
    a right lens including a second set of spectral filters adapted to pass said right eye images and to block said left eye images; and
    a frame for holding said left lens and said right lens, said frame including one or more positioning surfaces disposed to abut the face of a wearer and to position said left lens and said right lens within a distance range of 15-20 mm from left and right eyes of said wearer,
        wherein said positioning surfaces include a nose piece that is mounted to said frame at an adjustable position relative to said frame to adapt said distance range when said frame is worn by a person having a nose bridge between a first length and a second length shorter than said first length, wherein said nose piece is mounted to said frame via a fastener passing through a hole in said frame, wherein said fastener threads into an alternate threaded opening in said nose piece, and wherein said frame further comprises an adjustment wheel forming a threaded engagement with said fastener to adjust said position of said nose piece relative to said frame.

2. The eyewear of claim 1, wherein said positioning surfaces include a brow engaging surface.

3. The eyewear of claim 1, wherein the first set of spectral filters have a thickness that is greater near edges of the left lens than near a center of the left lens and wherein the second set of spectral filters have a thickness that is greater near edges of the right lens than near a center of the right lens.

4. The eyewear of claim 1, wherein said nose piece simultaneously contacts, when said eyewear is worn by a person, a left side and a right side of said person's nose.

5. Eyewear for viewing 3D images, each 3D image including a left eye image and a right eye image, said eyewear including:
   a left lens including a first set of spectral filters adapted to pass said left eye images and to block said right eye images;
   a right lens including a second set of spectral filters adapted to pass said right eye images and to block said left eye images; and
   a frame for holding said left lens and said right lens, said frame including one or more positioning surfaces disposed to abut the face of a wearer and to position said left lens and said right lens within a distance range of 15-20 mm from left and right eyes of said wearer,
   wherein said positioning surfaces include a nose piece that is mounted to said frame at an adjustable position relative to said frame to adapt said distance range when said frame is worn by a person having a nose bridge between a first length and a second length shorter than said first length,
   wherein said nose piece travels along an axis during adjustment of the position of said nose piece relative to said frame,
   wherein said axis is substantially parallel to a wearer's straight-ahead line of sight,
   wherein said nose piece is mounted to said frame via a fastener passing through a hole in said frame,
   wherein said fastener threads into an alternate threaded opening in said nose piece, and
   wherein said frame further comprises an adjustment wheel forming a threaded engagement with said fastener to adjust said position of said nose piece relative to said frame by moving said nose piece along said axis.

6. The eyewear of claim 5, wherein the position of said nose piece relative to said frame is non-destructively adjustable.

7. The eyewear of claim 5, wherein said nose piece simultaneously contacts, when said eyewear is worn by a person, a left side and a right side of said person's nose.

8. The eyewear of claim 5, wherein the first set of spectral filters have a thickness that is greater near edges of the left lens than near a center of the left lens and wherein the second set of spectral filters have a thickness that is greater near edges of the right lens than near a center of the right lens.

* * * * *